(12) United States Patent
Vancini et al.

(10) Patent No.: US 11,423,137 B1
(45) Date of Patent: *Aug. 23, 2022

(54) SETTING AN AUTHORIZATION LEVEL AT ENROLLMENT

(71) Applicant: Wells Fargo Bank, N.A., San Francisco, CA (US)

(72) Inventors: Adam Evans Vancini, Concord, CA (US); Christopher Phillip Clausen, Novato, CA (US); Darrell L. Suen, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,654

(22) Filed: Apr. 22, 2020

Related U.S. Application Data

(63) Continuation of application No. 16/378,144, filed on Apr. 8, 2019, now Pat. No. 10,664,587, which is a continuation of application No. 14/506,250, filed on Oct. 3, 2014, now Pat. No. 10,255,429.

(51) Int. Cl.
*G06F 21/45* (2013.01)
*G06F 21/33* (2013.01)

(52) U.S. Cl.
CPC ............ *G06F 21/45* (2013.01); *G06F 21/335* (2013.01); *G06F 2221/2113* (2013.01); *G06F 2221/2117* (2013.01)

(58) Field of Classification Search
CPC ................... G06F 21/45; G06F 21/335; G06F 2221/2117; G06F 2221/2113

USPC ............................................................. 726/4
See application file for complete search history.

(56) References Cited

U.S. PATENT DOCUMENTS

| | | | |
|---|---|---|---|
| 4,720,860 A | 1/1988 | Weiss | |
| 4,856,062 A | 8/1989 | Weiss | |
| 4,885,778 A | 12/1989 | Weiss | |
| 6,012,144 A | 1/2000 | Pickett | |
| 6,067,621 A | 5/2000 | Yu et al. | |
| 6,393,298 B1 | 5/2002 | Fulton | |

(Continued)

FOREIGN PATENT DOCUMENTS

| | | |
|---|---|---|
| KR | 101206072 B1 | 11/2012 |
| NL | 1019440 C2 | 6/2003 |

(Continued)

OTHER PUBLICATIONS

A. El Husseini, et al.; "A Novel Trust-Based Authentication Scheme for Low-Resource Devices in Smart Environments"; www.sciencedirect.com; Procedia Computer Science, vol. 5, 2011.

(Continued)

*Primary Examiner* — Teshome Hailu
*Assistant Examiner* — Aubrey H Wyszynski
(74) *Attorney, Agent, or Firm* — Foley & Lardner LLP

(57) ABSTRACT

An authorization level is set at enrollment. The authorization level can be determined based on user identity and a class of authentication. The class of authentication can be associated with strength of authentication related to a channel employed to enroll a user for access to products or services. Authorization level can also be determined based on initiation information regarding the user, a device of the user, or both. Access to the products or services can be selectively controlled based on the authorization level.

16 Claims, 6 Drawing Sheets

(56) References Cited

U.S. PATENT DOCUMENTS

| | | | |
|---|---|---|---|
| 6,707,915 B1 | 3/2004 | Jobst et al. | |
| 6,758,394 B2 | 7/2004 | Maskatiya et al. | |
| 6,879,825 B1 | 4/2005 | Daly | |
| 6,915,272 B1 | 7/2005 | Zilliacus et al. | |
| 6,934,858 B2 | 8/2005 | Woodhill | |
| 7,086,085 B1 | 8/2006 | Brown et al. | |
| 7,161,465 B2 | 1/2007 | Wood et al. | |
| 7,363,494 B2 | 4/2008 | Brainard et al. | |
| 7,614,078 B1 | 11/2009 | Stieglitz | |
| 7,680,491 B2 | 3/2010 | Zabawskyj et al. | |
| 7,908,645 B2 | 3/2011 | Varghese et al. | |
| 7,945,946 B2 | 5/2011 | Rowley | |
| 8,255,971 B1 | 8/2012 | Webb et al. | |
| 8,281,379 B2 | 10/2012 | Noe | |
| 8,315,595 B2 | 11/2012 | Murphy et al. | |
| 8,365,252 B2 | 1/2013 | Mahaffey et al. | |
| 8,369,887 B2 | 2/2013 | Choe et al. | |
| 8,452,693 B2 | 5/2013 | Shah et al. | |
| 8,533,118 B2 | 9/2013 | Weller et al. | |
| 8,555,355 B2 | 10/2013 | Rathbun | |
| 8,584,219 B1 | 11/2013 | Toole et al. | |
| 8,595,808 B2 | 11/2013 | Langley | |
| 8,612,747 B2 | 12/2013 | Roskind | |
| 8,613,055 B1 | 12/2013 | Tomilson et al. | |
| 8,625,796 B1 | 1/2014 | Ben Ayed | |
| 8,677,116 B1 | 3/2014 | Bicer | |
| 8,775,814 B2 | 7/2014 | Bidare | |
| 8,839,360 B1* | 9/2014 | Orr | G06F 21/33 726/2 |
| 9,020,479 B1 | 4/2015 | Somayajula et al. | |
| 9,357,378 B1 | 5/2016 | Delker et al. | |
| 9,400,877 B2 | 7/2016 | Isozaki et al. | |
| 9,473,490 B2 | 10/2016 | Clausen et al. | |
| 9,639,692 B1 | 5/2017 | Xue | |
| 10,255,429 B2* | 4/2019 | Vancini | G06F 21/45 |
| 10,664,587 B1* | 5/2020 | Vancini | G06F 21/335 |
| 2003/0070091 A1* | 4/2003 | Loveland | H04L 63/205 726/12 |
| 2003/0181219 A1 | 9/2003 | Huang | |
| 2004/0019564 A1 | 1/2004 | Goldthwaite et al. | |
| 2006/0120607 A1 | 6/2006 | Lev | |
| 2007/0015538 A1 | 1/2007 | Wang | |
| 2008/0046988 A1 | 2/2008 | Baharis et al. | |
| 2008/0051062 A1 | 2/2008 | Lee | |
| 2008/0075281 A1 | 3/2008 | Zeng | |
| 2008/0081609 A1 | 4/2008 | Burgan et al. | |
| 2008/0162338 A1 | 7/2008 | Samuels et al. | |
| 2008/0207203 A1 | 8/2008 | Arthur et al. | |
| 2009/0259588 A1 | 10/2009 | Lindsay | |
| 2011/0010761 A1 | 1/2011 | Doyle | |
| 2011/0138175 A1 | 6/2011 | Clark et al. | |
| 2011/0225625 A1 | 9/2011 | Wolfson et al. | |
| 2011/0289572 A1 | 11/2011 | Skeel | |
| 2012/0030354 A1 | 2/2012 | Razzaq et al. | |
| 2012/0130901 A1 | 5/2012 | Coppinger | |
| 2012/0131338 A1* | 5/2012 | Bellwood | H04L 9/3271 713/168 |
| 2012/0172067 A1 | 7/2012 | Gillin | |
| 2012/0295580 A1 | 11/2012 | Corner | |
| 2012/0324568 A1 | 12/2012 | Wyatt et al. | |
| 2013/0006848 A1 | 1/2013 | Kuttuva | |
| 2013/0042298 A1 | 2/2013 | Plaza Fonseca et al. | |
| 2013/0054454 A1 | 2/2013 | Purves et al. | |
| 2013/0055346 A1 | 2/2013 | Singh et al. | |
| 2013/0080276 A1 | 3/2013 | Granbery | |
| 2013/0145447 A1 | 6/2013 | Maron | |
| 2013/0227646 A1 | 8/2013 | Haggerty et al. | |
| 2013/0227666 A1* | 8/2013 | White | H04L 63/08 726/7 |
| 2013/0227677 A1 | 8/2013 | Pal et al. | |
| 2013/0317928 A1 | 11/2013 | Laracey | |
| 2013/0326605 A1 | 12/2013 | Betz et al. | |
| 2013/0331063 A1 | 12/2013 | Cormier et al. | |
| 2014/0020929 A1 | 1/2014 | Hisada et al. | |
| 2014/0051398 A1 | 2/2014 | Ben Shlush et al. | |
| 2014/0066015 A1 | 3/2014 | Aissi | |
| 2014/0074490 A1 | 3/2014 | Kundu et al. | |
| 2014/0096222 A1 | 4/2014 | Colnot | |
| 2014/0189841 A1 | 7/2014 | Metke et al. | |
| 2015/0032625 A1* | 1/2015 | Dill | G06Q 20/4016 705/44 |
| 2015/0193781 A1* | 7/2015 | Dave | H04L 63/20 705/318 |
| 2016/0337344 A1 | 11/2016 | Johansson et al. | |
| 2017/0032111 A1 | 2/2017 | Johansson et al. | |
| 2017/0134944 A1 | 5/2017 | Christian et al. | |
| 2017/0171804 A1 | 6/2017 | Waltermann et al. | |

FOREIGN PATENT DOCUMENTS

| | | | |
|---|---|---|---|
| TW | 200941410 A | 10/2009 | |
| TW | 201101215 A | 1/2011 | |
| WO | WO-2013/087018 A1 | 6/2013 | |
| WO | WO-2013/133763 A1 | 9/2013 | |

OTHER PUBLICATIONS

A. Hiltgen, et al.; "Secure Internet Banking Authentication"; The IEEE Computer Society, 2005, 9 pages.

Alain Hil Tgen, Thorston Kramp and Thomas Weigold; The IEEE Computer Society; Secure Internet Banking Authentication; 2005, 9 pages.

K. Renaud; "A Process for Supporting Risk-Aware Web Authentication Mechanism Choice"; www.sciencedirect.com; 2007, Reliability Engineering & System Safety; vol. 92, Issue 9, pp. 1204-1217.

Kett An I, et al.; "Mldm: an Open Architecture for Mobile Identity Management"; Journal of Convergence; vol. 2, No. 2; Dec. 2011, 8 pages.

Mozillawiki; WebAPI/WebPayment/Multi-SIM; https://wikimozilla.org/WebAPI/WebPayment/Multi-SIM; Mar. 28, 2014; pp. 3-4.

R. Balakrishna, et al.; "Secure authenticated key exchange protocol for credential services"; DESI DOC Journal of Library & Information Technology, v 29, n 3, 49-53, May 2009; ISSN: 0974-0643; Publisher: Defence Scientific Information and Documentation Centre, India.

RSE; "Using a Risk-Based Approach to Address a Changing Threat Landscape"; www.bitpip.com/detail/RES/1384145648_319.html; Jan. 2013.

W. Han, et al.; "Anti-phishing by smart mobile device"; IFIP International Conference on Network and Parallel Computer Workshops, Fudan Univ., Shanghai, China; Sep. 18-21, 2007, Liaoning, China; Publisher: IEEE, Piscataway, NJ, USA.

\* cited by examiner

SETTING AN AUTHORIZATION LEVEL AT ENROLLMENT

CROSS-REFERENCE TO RELATED APPLICATIONS

This application is a continuation of U.S. patent application Ser. No. 16/378,144, filed Apr. 8, 2019 (now U.S. Pat. No. 10,664,587), and entitled "SETTING AN AUTHORIZATION LEVEL AT ENROLLMENT," which is a continuation of U.S. patent application Ser. No. 14/506,250, filed Oct. 3, 2014 (now U.S. Pat. No. 10,255,429), and entitled "SETTING AN AUTHORIZATION LEVEL AT ENROLLMENT." The entireties of the above applications are incorporated herein by reference.

BACKGROUND

Businesses, such as financial institutions, provide multiple channels (e.g., physical storefronts, telephone networks, internet, web-based applications, cellular network) for users to access products and services that the businesses offer. For example, a user may conduct financial transactions using a web-based application on a mobile device. However, each channel has limitations. For example, a user may not be able to open a new account using an ATM, because the ATM does not verify a user's identity to the same extent that a human agent at a physical branch location may. Therefore, while users may be able to connect with a business using the channels to conduct some transactions, the users will not be able to connect to the business using those channels to perform other transactions.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

As discussed above, users interact with businesses using a number of channels. For example, users may prefer to access online banking with their own device rather than conducting business by going to a physical bank branch. However, many activities done outside of the store/branch channel may be limited or slightly different in process because a human agent at the branch is not present to verify the user's identity and authenticate the user. As described herein, authentication is the ability to verify that the user is who the user purports to be.

Described herein are examples of systems, methods, and other embodiments associated with setting an authorization level at enrollment. Setting an authorization level may also include device binding. The systems, methods, and other embodiments described herein set an authorization level for a user based on the channel that the user employs to enroll a device that will be used to access products or services offered by a business. Accordingly, as used herein, authorization imbues the user with a predetermined amount of access based on the authorization level the user is granted. For example, when a user accesses a financial institution through virtual channels (e.g., internet, mobile network, telephone bank), the identity of the user is authenticated such that the financial institution can confirm that the user is who the user purports to be to a predetermined degree of certainty. As will be described in greater detail below, the user is then assigned an authorization level based on the degree of certainty with which the user is authenticated when enrolling; a device for access.

Thus, different levels of strength in authentication at enrollment and device binding dictate the first-time experience the user has when accessing services and products. For example, a high level of authorization may be provided to a first-time customer, if the customer enrolls for access using a channel corresponding to an agent at a branch location because the agent can confirm the identity of the user in person to a high degree of certainty. Additionally, a high authorization level may be provided based on the device binding occurring in a controlled environment. A medium level of authorization for a customer may be granted if the user authenticates at an ATM, and then binds the device at that same ATM. For example, a user may provide a bankcard, personal identification number (PIN), biometrics, or some combination thereof that falls short of in-person authentication, but still provides strong verification of the user's identity. At a baseline level of authentication, the user may enroll via phone or internet channels using conventional means (e.g., name, address, password, etc.).

Accordingly, there are different classes of authentication based on the ability of the channel to authenticate the user. The classes of authentication correspond to different levels of authorization or access via the virtual channel that the user employs. The highest level of authorization may allow a user to use the channels to open new accounts or perform large transactions. The medium level of authorization may not allow a user to open a new account but may allow a user to make some large transactions. The baseline level of authorization may not allow the user to open a new account and also impose a lower maximum on the transaction amount but may allow a user to conduct some transactions. Accordingly, the authorization levels limit a user's access to tools based on the method the user employed to enroll. By setting the level of authorization based on the class of authentication assigned to the channel used to enroll the user and to bind the user's device, users can be given access to products and services using the channel that is most convenient for that user. Moreover, the business, such as a financial institution, can reduce risk by limiting the user's access to products and services based on the businesses ability to verify the identity of the user.

The following description and drawings set forth certain illustrative aspects and implementations. These are indicative of but a few of the various ways in which one or more aspects may be employed. Other aspects, advantages, or novel features of the disclosure will become apparent from the following detailed description when considered in conjunction with the drawings.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
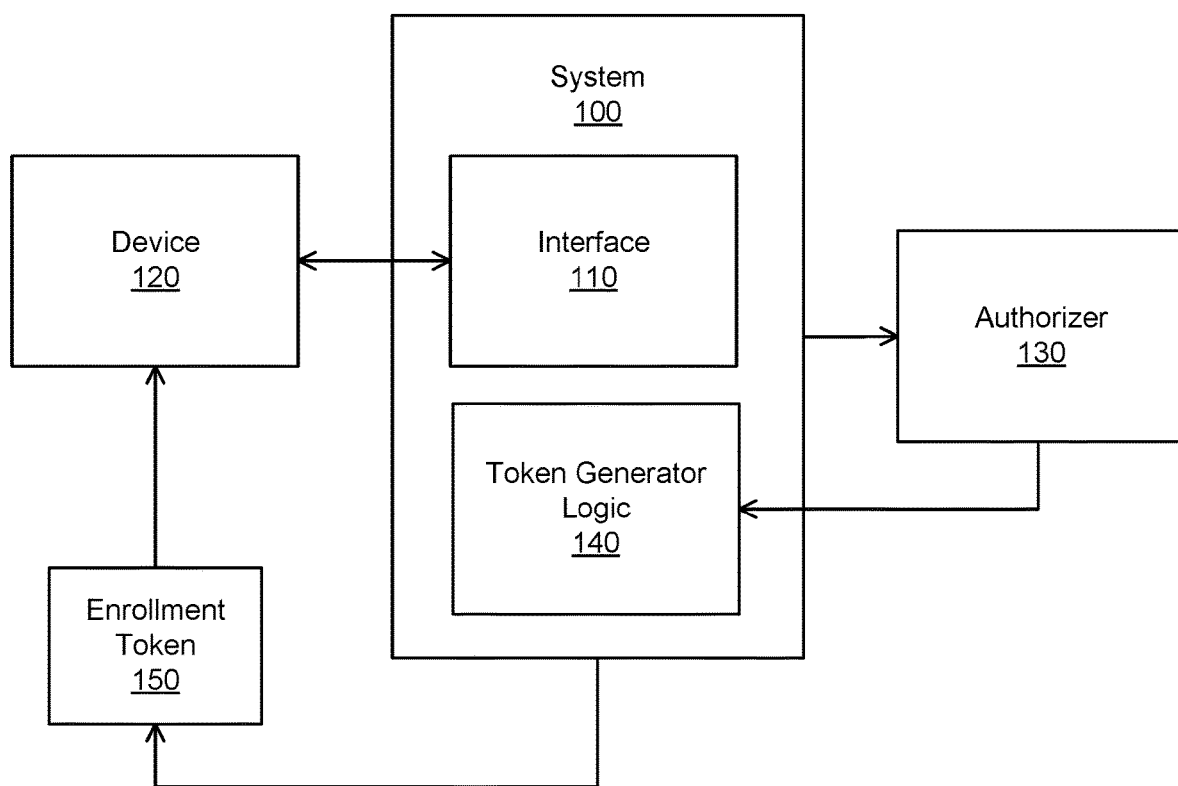
FIG. 1 illustrates one embodiment of a system associated with setting an authorization level at enrollment.

Embodiments or examples illustrated in the drawings are disclosed below using specific language. It will nevertheless be understood that the embodiments or examples are not intended to be limiting. Any alterations and modifications in the disclosed embodiments and any further applications of the principles disclosed in this document are contemplated as would normally occur to one of ordinary skill in the pertinent art. Described herein are examples of systems, methods, and other embodiments associated with setting an authorization level and enrollment.

FIG. 1 is an illustration of an example of a system 100 associated with setting an authorization level at enrollment. The system 100 includes an interface 110. The interface may be a digital channel that allows a device 120 to access products and services. In one embodiment, the interface 110 is an application (i.e., app) that a user (not shown) can access from the device 120 that is a mobile device. In an alternative embodiment, the interface 110 is a web-based tool (e.g., JAVA application, online banking tool, bar code scanner, QR code scanner, pattern recognition logic, etc.). The device 120 used to access the interface 110 may be a phone, tablet, laptop computer, desktop computer, wearable computer, electronic display of a motor vehicle and so on. In one embodiment, the interface 110 is a digital channel specifically designed as an interface for the device 120.

A user is able to enter information using the interface 110. For example, the user may be asked to provide specific information (e.g., name address, social security number, account number, telephone number, personal identification number (PIN), email address, etc.) using the interface 110. Alternatively, a user may determine what information to provide. The device 120 receives the information from the interface 110 as initiation information. In one embodiment, the device 120 arranges the information into a predetermined initiation format. The format may be defined using extensible markup language (XML) tag. The device 120 provides the initiation information to an authorizer 130. In one embodiment, the device 120 may use the interface 110 to send the initiation information to the authorizer 130. In another embodiment, upon accessing the interface 110, the device 120 may automatically provide initiation information to the authorizer 130. For example, the device 120 may aggregate previously entered data as the initiation information and send the initiation information to the authorizer 130.

An authorizer 130 verifies the user's identity based on the initiation information provided by the device 120. The authorizer 130 is an entity of the business offering the products or services to the user. For example, the authorizer 130 may be a human agent of business, such as a teller at a bank branch. Alternatively, the authorizer 130 may be an electronic kiosk, ATM, authorizer logic designed to function in conjunction with an interface 110 that is an application or web based tool, a telephone operator, automated telephony program designed to work with digital channel for receiving telephone data such as Voice over Internet Protocol (VoIP), etc. Thus, the identity of the authorizer 130 may be based on the digital channel of the interface 110. For example, a device 120 accessing an interface 110 via an ATM has implicitly selected the ATM to be the authorizer 130.

In one embodiment, the authorizer 130 is assigned a class. The class is assigned based on the ability of the authorizer 130 to verify a user's identity. For example, the ability of the authorizer 130 to make a determination that the user is the individual that the user purports to be. Consider that an authorizer 130 that is a human agent is more likely to accurately verify a user's identity than an authorizer 130 that is an automated telephone operator. Accordingly, an authorizer 130 that is a human agent is in a higher class than the automated telephone operator. The authorizer 130 may be integrated with the interface 110. Alternatively, the authorizer 130 may access the interface 110 to assess the initiation information.

In response, to the initiation information being received from the interface 110 and/or the device 120, the authorizer 130 may make an assessment to verify the user's identity based on the initiation information. The authorizer 130 transmits the assessment back to the system 100. Suppose that the authorizer 130 verifies a user. The authorizer 130 provides the token generator logic 140 with verification data that indicates whether the user has been verified. For example, the authorizer 130 transmits verification data including a binary value indicating a verification and an identifier that identifies the initiation information associated with the user on the device 120 to the token generator logic 140. Alternatively, the authorizer 130 may transmit a binary value indicating that the user has not been verified or the authorizer 130 may not transmit verification data if the user is not verified.

In response to the authorizer 130 authorizing the device 120, the token generator logic 140 generates an enrollment token 150. The enrollment token 150 defines the level of authorization. The token generator logic 140 may set a level of authorization based on the class of the authorizer 130. In another embodiment, the authorizer 130 may be able to assign a device a level of authorization from a group of levels of authorization. For example, the authorizer 130 may specify a level of authorization in the data transmitted to the token generator logic 140. Additionally, or alternatively, the authorizer 130 may select a level of authorization based on information provided to the authorizer 130 in the initiation information. For example, if third party information is not available for the device 120, the device 120 may be deemed to be associated with additional risk, and thus while the user may have authenticated to a high degree, the device 120 is given a lower authorization level based on the additional risk. Accordingly, the enrollment token 150 reflects the level of authorization based on and/or assigned by the authorizer 130.

The enrollment token 150 is then acquired by the device 120. For example, the enrollment token 150 may be embedded in a QR code scanned by the device 120. Alternatively, the device 120 may receive the token via a digital channel not encompassed by the interface 110, such as a wireless network (Wi-Fi), local area network (LAN), wide area network (WAN) and so on. Using the enrollment token 150, the user operating the device 120 can use products or services to an extent based on the authorization level defined in the enrollment token 150. In one embodiment, the device is bound to user by virtue of the enrollment token 150. By binding the device to the user, the relationship between the user and device is formalized, such that each can be identified as known. The device binding may be implemented by placing identifying information, such as a cookie, on the device. For example, the token generator logic 140 may generate the enrollment token 150 to include the identifying information.

In one embodiment, the level of authorization provided in the enrollment token 150 defines security parameters that limit the ability of the device 120 to access service and products using digital channels. For example, as discussed above, the highest level of authorization may allow a user to employ the device 120 to use the digital channels to open new accounts or perform large transactions. The medium level of authorization may not allow the user to employ the device 120 to use the digital channels to open a new account but may allow a user to make some large transactions. The baseline level of authorization may not allow the user to employ the device 120 to use the digital channels to open a new account and have a lower maximum on the transaction amount. Accordingly, the authorization levels limit a user's access to products and services based on the digital channel the user employed to enroll.

Figure 2:
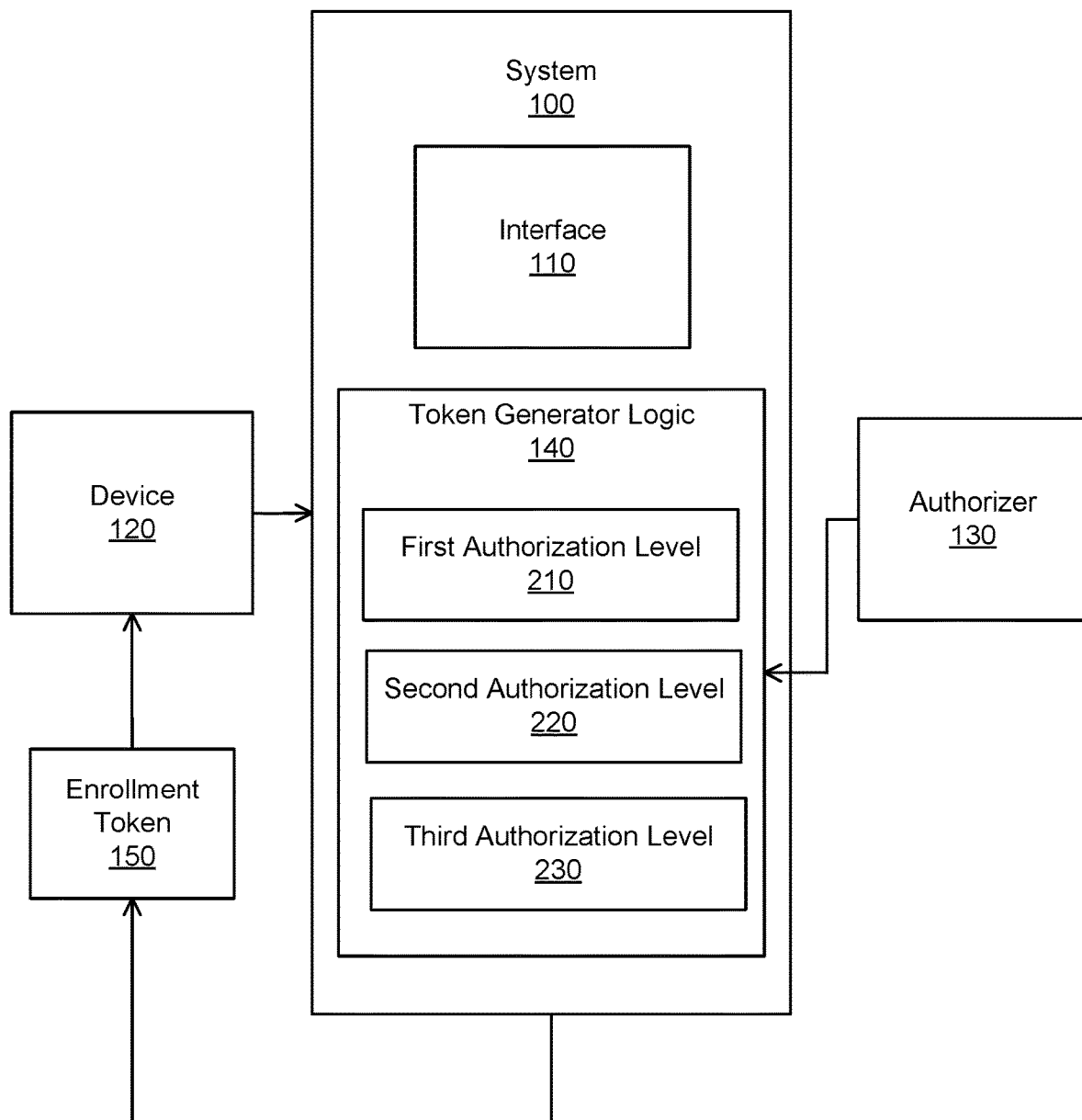
FIG. 2 illustrates one embodiment of a system associated with setting an authorization level from a group of authorization levels at enrollment.

FIG. 2 illustrates one embodiment of a system 100 associated with setting an authorization level at enrollment. The interface 110, device 120, authorizer 130, token generator logic 140, and the enrollment token 150 operate in a similar manner as discussed above with respect to FIG. 1. Additionally, the token generator logic 140 includes a number of authorization levels 210-230.

In the embodiment of FIG. 2, the token generator logic 140 selects an authorization level and generates an enrollment token 150 having the selected authorization level. In one embodiment, the authorization level is set based on both the class of the authorizer 130 and/or the initiation information provided by the interface 110. The token generator logic 140 generates the token by selecting an authorization level. In one embodiment, the token generator logic 140 selects the authorization level based on (i) the initiation information and (ii) the class of the authorizer.

As one example, suppose that the token generator logic 140 has access to the initiation information as an element of the system 100, and the token generator logic 140 identifies inconsistencies or suspect data in the initiation information. The token generator logic 140 may determine that the inconsistencies do not necessitate refusing the device 120 an authorization level. Instead, the token generator logic 140 may generate an enrollment token 150 having a lower level of authorization than the class of the authorizer 130 would otherwise dictate. Accordingly, based on that determination, the token generator logic 140 may select a third authorization level 230 that imposes more restrictions on a user of the device 120 than a first authorization level 210.

In addition to using the initiation information and the class of the authorizer, the token generator may use other data to select an appropriate authorization level from a group of authorization levels. For example, the token generator logic 140 may include information provided by the device 120, such as the make and/or model of the device 120, the operating system of the device 120, or information from a subscriber identification module (SIM) card of a device 120. Accordingly, the token generator logic 140 may use alternative sources of information to select an authorization level.

Figure 3:
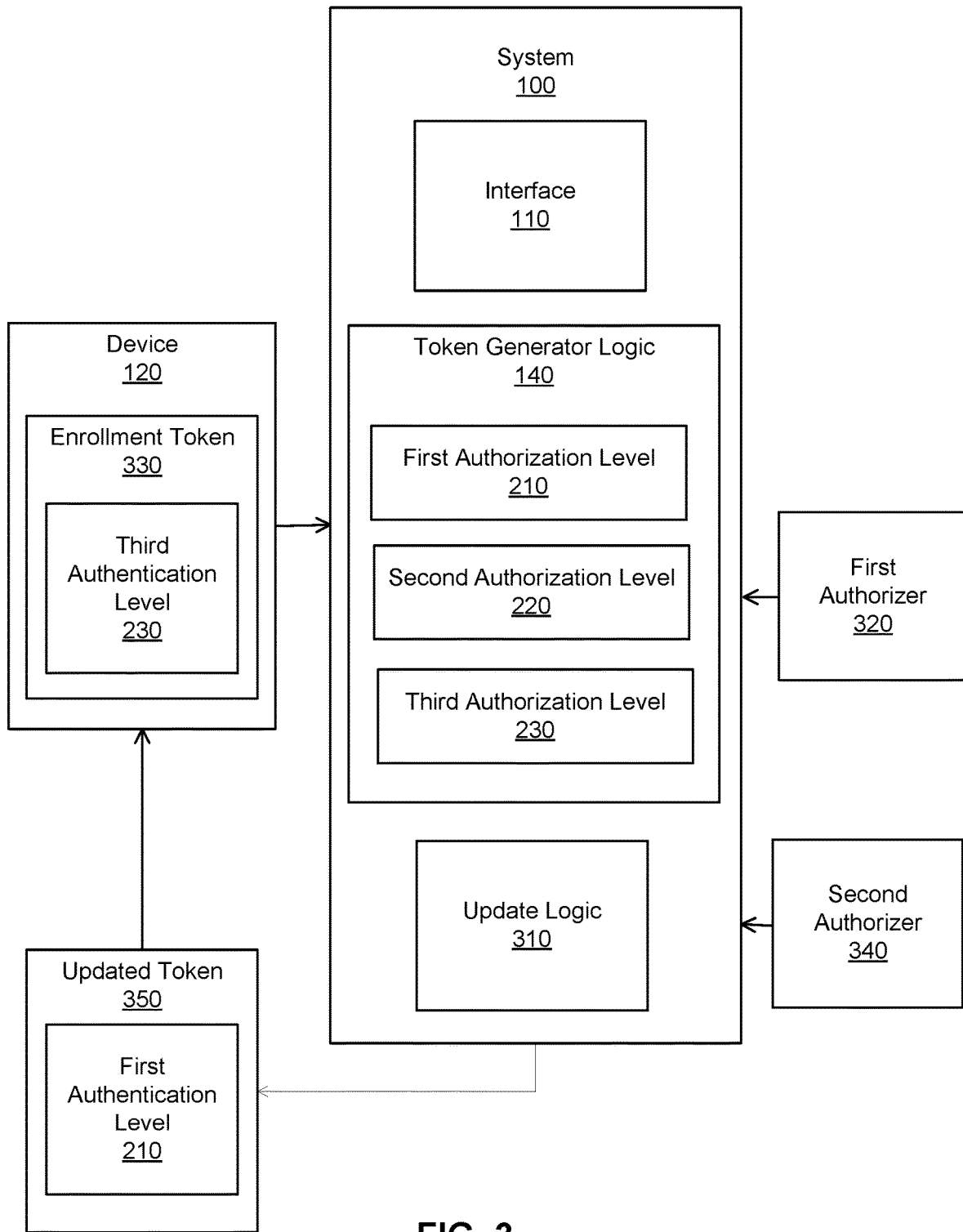
FIG. 3 illustrates another embodiment of a system associated with setting and updating an authorization level at enrollment.

FIG. 3 illustrates another embodiment of the system 100 associated with setting and updating an authorization level at enrollment. The interface 110, the device 120, and the token generator logic 140, operate in a similar manner as discussed above with respect to FIG. 1. Additionally, the token generator logic 140 having the first authorization level 210, the second authorization level 220, and the third authorization level 230 operates in a similar manner as discussed above with respect to FIG. 2. The system 100 further includes update logic 310.

The update logic 310 receives updated initiation information. In one embodiment, the update logic utilizes a different channel than the channel employed by the interface 110. Consider that based on initiation information previously entered in the interface 110 for a first authorizer 320 (i.e., an authorizer operating in a similar manner as described with respect to the authorizer 130 of FIG. 1), the device 120 receives an enrollment token 330 having the third authorization level 230. For example, the user may not have all the necessary initiation information to receive a higher authorization level, such as the first authorization level 210 or the second authorization level 220. Instead, the initiation information may have been previously provided by the user to receive a lower authorization level that would meet the user's initial needs with the plan to increase the authorization level when the user had the necessary initiation information to receive the higher authorization level.

Accordingly, consider that the user provides updated initiation information via the update logic 310. The updating initiation information may be provided from the updated logic 310 to the first authorizer 320 to which the previously provided initiation information was submitted. Alternatively, the updated initiation information may be provided from the update logic 310 to a second authorizer 340. For example, suppose that the first authorizer 320 is an ATM accessed by the user using the interface 110. The second authorizer 340 may be a human agent of the business updating the user's account with updated initiation information received from the update logic 310.

Accordingly, based on the updated initiation information and/or the identity of the first authorizer 320 and/or the second authorizer 340, the token generator logic 140 may generate an updated token 350. The updated token 350 has a first authentication level 210. Thus, the enrollment token 330 of the device 120 is replaced with an updated token 350 having a higher authorization level. In one embodiment, the device 120 only replaces a token if the newly received token has a higher authorization level. While shown here as an element of the system 100, the update logic 310 may be a separate entity associated with the system 100. In another embodiment, the functions of the update logic 310 may be associated with or subsumed by the interface 110.

Figure 4:
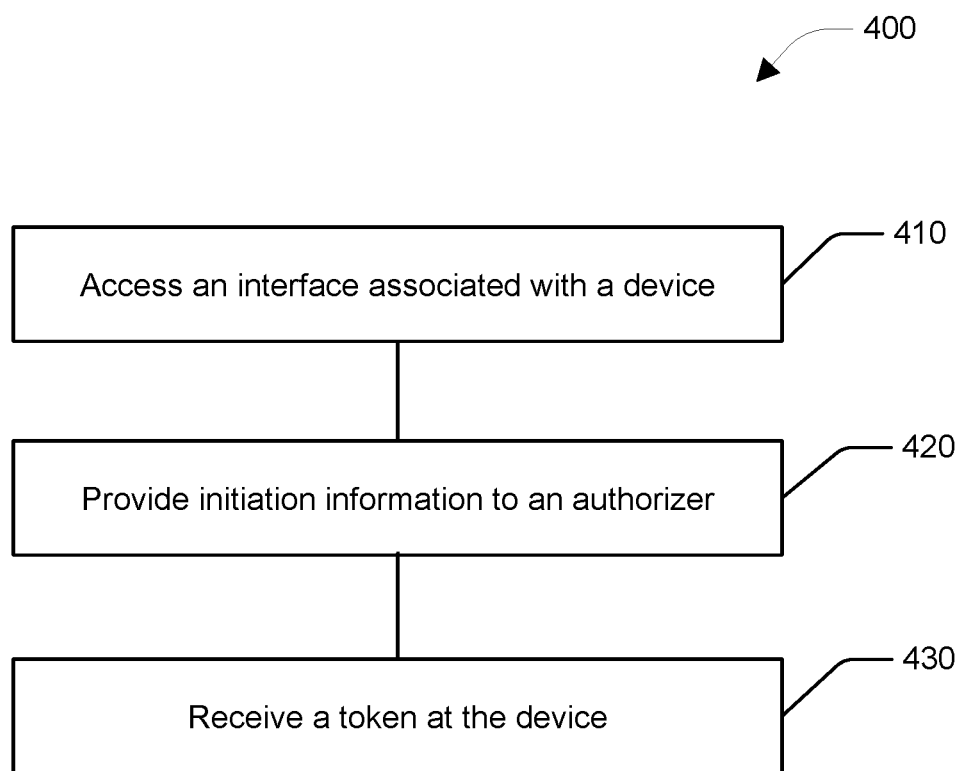
FIG. 4 illustrates one embodiment of a method associated with setting an authorization level at enrollment.

FIG. 4 illustrates one embodiment of a method associated with an example of a method 400 associated with setting an authorization level at enrollment. At 410, an interface associated with a device is accessed. The interface is a digital channel employed by the user. In one embodiment, the interface is an application on a user's mobile device (smart phone, tablet, wearable smart device, vehicle electronic display, etc.). In this embodiment, the interface may be accessed by opening the application the mobile device. In another embodiment, the interface may be a web-based tool. A user may access the web-based tool by registering to use the web-based tool.

At 420, initiation information is provided for the user of the device to an authorizer. The initiation information may be information about the user such as name, address, email address, social security, account number, email address, birthdate, mother's maiden name, an address of a residence occupied in the last ten years, etc. Alternatively, or additionally, the initiation information may include device information such as internet protocol (IP) address, media access control (MAC) address, network identity information and so on. The user may be queried to provide the initiation information. Alternatively, the device may provide the information automatically using the interface in response to the interface being accessed.

The authorizer is associated with a class that is defined by the authorizer's ability to verify the user's identity. As discussed above, the classes correspond to different levels of authorization. For example, the classes may include a heightened level of authorization, a medium level of authorization, and a baseline level of authorization. For example, an authorizer that is a human agent working out of a bank branch may be have a heightened level of authorization because the agent has the highest probability of accurately verifying the user's identity. Conversely, a web-based tool that registers users with a username and password may be in a class corresponding to the baseline level of authorization, because the web-based tool is less likely to accurately verify the user's identity. An ATM that requests a bankcard and PIN may be in a class corresponding to a medium level of authorization because the ATM does request information that can be compared to a financial institutions records in order to verify the user's identity. Accordingly, the ability of the authorizer to verify the user's identity is the primary component to defining the authorizer's class.

At 430, an enrollment token is received at the device. The enrollment token assigns an authorization level to the user via the device. In one embodiment, the enrollment token defines the level of authorization for the user when the user is using the device. Accordingly, the user and the device may be bound to each other at the given authorization level. As discussed above the authorization level is based in part on the class of the authorizer. Additionally, the authorization level defined in the enrollment token is set based on the initiation information. For example, if it is determined based on the initiation information that a user is enrolling and the records for that user show that the user routinely makes large withdrawals, the authorization level may be set so that the user has the authorization level necessary to make large withdrawals. In this manner, the authorization level defines security parameters for the device to use the interface. Accordingly, if the authorizer cannot verify a user's identity or the initiation information is indicative of inconsistencies with a user, the user can be assigned an authorization level that prevents that user from accessing products and services. Conversely, if the authorizer is able to verify the user's identity and/or the initiation information indicates that the user is trusted, the user may be assigned a heightened authorization level.

Figure 5:
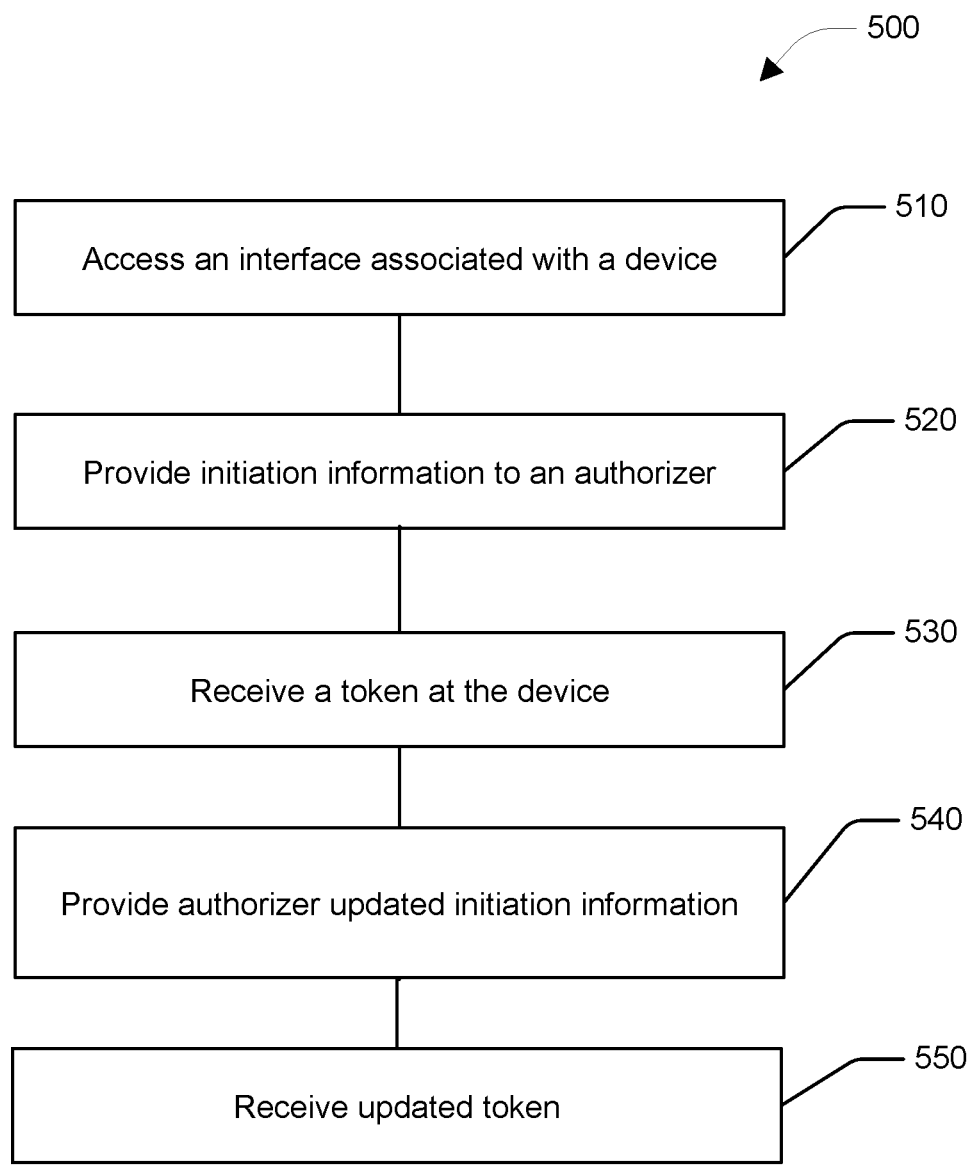
FIG. 5 illustrates one embodiment of a method associated with setting and updating an authorization level at enrollment.

FIG. 5 illustrates one embodiment of a method 500 associated with automated setting an authorization level at enrollment. Steps 510, 520, and 530, operate in a similar manner as steps 410, 420, and 430, respectively, described with respect to FIG. 4. Therefore, at 510, an interface associated with a device is accessed. At 520, initiation information for a user is provided to an authorizer. At 530, an enrollment token is received from the authorizer. The enrollment token defines a level of authorization for the user of the device.

At 540, updated initiation information is sent to the authorizer. In one embodiment, the updated information may be provided via the interface. Alternatively, the user may provide updated information using a different channel. For example, a user may sign up using a web-based tool on a mobile device. The user may choose to enroll in a program via a web-based tool because it is more convenient than going to a branch. Accordingly, the user may receive a baseline authorization level thereby limiting the user's ability to access certain products or services. The user may then travel to a branch in order to increase their level of authorization when it is more convenient for the user. Accordingly, the user may provide an agent at bank branch updated initiation information such as documentation to be uploaded that the agent can use to verify the user's identity.

At 550, the user receives an updated token having a different authorization level. For example, once the authorizer, here the agent, is able to verify the user's identity the user may scan a QR code assigned to that agent. In response to scanning the QR code, the user's device may automatically receive an updated authorization level. For example, the user may transition from the baseline level of authorization to a heightened level of authorization based on the updated token. Conversely, a user may transition to a lower level of authorization if when attempting to update the user's authorization level the user provides updated initiation information that is suspected of fraud. Accordingly, a business can reduce the ability of fraudsters to commit fraud by limiting a user's level of authorization. Thus, the business is able to effectively manage risk. At the same time, the user may begin accessing, to some degree, products and services via digital channels that are convenient to that user.

Figure 6:
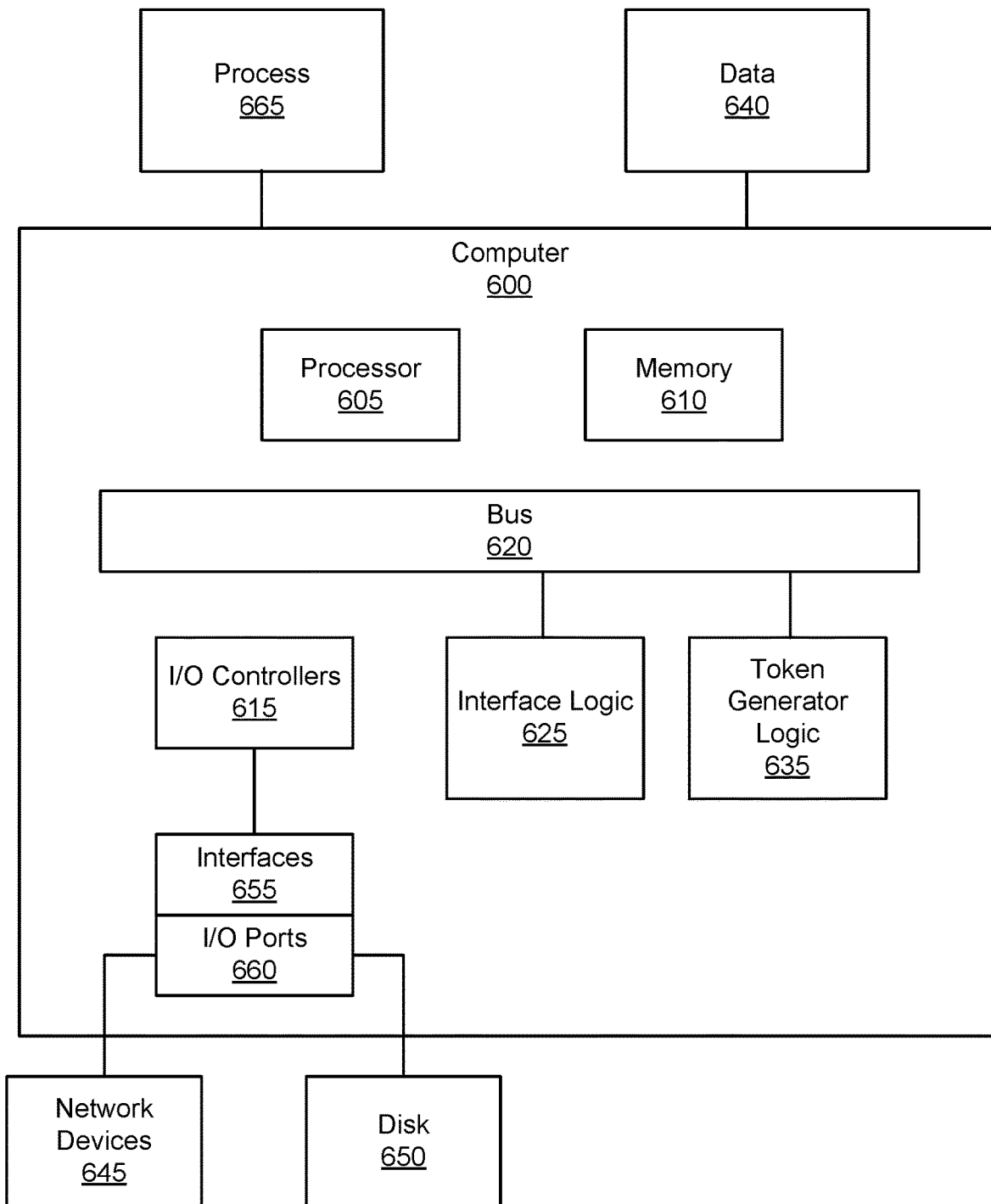
FIG. 6 illustrates one embodiment of an example computer environment associated with setting an authorization level at enrollment.

FIG. 6 illustrates one embodiment of an example computer environment associated with setting an authorization level at enrollment. The computer environment in which the systems and methods described herein, and equivalents, may operate may include a computer 600. The computer includes a processor 605, a memory 610, and input/output (I/O) ports 615 operably connected by a bus 620. In one example, the computer 600 may include an interface logic 625 and a token generator logic 635. The interface logic 625 is configured to enable a user to provide an authorizer with initiation information. The token generator logic 635 is configured to generate an enrollment token defining an authorization level based on information from the initiation data and/or the authorizer.

In different examples, the interface logic 625 and the token generator logic 635 may be implemented in hardware, a non-transitory computer-readable medium with stored instructions, firmware, and/or combinations thereof. While the interface logic 625 and the token generator logic 635 are illustrated as hardware components attached to the bus 620, it is to be appreciated that in one example, the interface logic 625 and/or the token generator logic 635 could be implemented in the processor 605. Moreover, the interface logic 625 and/or the token generator logic 635 may be stored in the memory 610.

In one embodiment, the interface logic 625 is a means (e.g., hardware, non-transitory computer-readable medium, firmware) for providing initiation information to an authorizer. The token generator logic 635 is a means (e.g., hardware, non-transitory computer-readable medium, firmware) generating an enrollment token that defines an authorization level. The means may be implemented, for example, as an ASIC programmed to facilitate data editing in a web-based interactive web response system. The means may also be implemented as stored computer executable instructions that are presented to computer 600 as data 640 that are temporarily stored in memory 610 and then executed by processor 605.

Generally describing an example configuration of the computer 600, the processor 605 may be a variety of various processors including dual microprocessor and other multi-processor architectures. The memory 610 may include volatile memory and/or non-volatile memory. Non-volatile memory may include, for example, ROM, PROM, and so on. Volatile memory may include, for example, RAM, SRAM, DRAM, and so on.

Network device 645 and a disk 650 may be operably connected to the computer 600 via, for example, an I/O interfaces (e.g., card, device) 655 and an I/O ports 660. The disk 650 may be, for example, a magnetic disk drive, a solid state disk drive, a floppy disk drive, a tape drive, a Zip drive, a flash memory card, a memory stick, and so on. Furthermore, the disk 650 may be a CD-ROM drive, a CD-R drive, a CD-RW drive, a DVD ROM, and so on. The memory 610 can store data 640 and/or a process 665, for example. The disk 650 and/or the memory 610 can store an operating system that controls and allocates resources of the computer 600.

The bus 620 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 620 can be types including, for example, a memory bus, a memory controller, a peripheral bus, an external bus, a crossbar switch, and/or a local bus.

The computer 600 may interact with I/O devices via the I/O interfaces 655 and the I/O ports 660. Input/output devices may be, for example, a keyboard, a microphone, a pointing and selection device, cameras, video cards, displays, the network devices 645, the disk 650, and so on. The I/O ports 660 may include, for example, serial ports, parallel ports, and USB ports.

The computer 600 can operate in a network environment and thus may be connected to the network devices 645 via the I/O interfaces 655, and/or the I/O ports 660. Through the network devices 645, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage medium may include, but are not limited to, a computer-readable medium, a floppy disk, a flexible disk, a hard disk, a magnetic tape, other magnetic medium, an ASIC, a CD, other optical medium, a RAM, a ROM, a memory chip or card, a memory stick, and other media that can store instructions and/or data. Computer storage medium described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C § 101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein is limited to statutory subject matter under 35 U. S. C § 101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system, comprising:
   a processor coupled to a memory that stores instructions that when executed by the processor cause the processor to:
   determine an authorization level for a user of a device based on user identity and a class of authentication in response to a request for access to a service, wherein the class of authentication is associated with strength of authentication with respect to a channel employed to enroll the user for access;
   generate an enrollment token including identifying information that identifies the device, the enrollment token defining a level of authorization based on the determined authorization level;
   send the enrollment token to the device, and
   selectively control access to the service by the device based on the level of authorization defined by the enrollment token on the device.

2. The system of claim 1, wherein the enrollment token binds the user and the device.

3. The system of claim 1, wherein the instructions further cause the processor to determine the authorization level based on initiation information provided at enrollment.

4. The system of claim 3, wherein the instructions further cause the processor to determine the authorization level lower than that associated with the channel based on the initiation information.

5. The system of claim 1, wherein the instructions further cause the processor to determine an updated authorization level based on a change in the class of authentication associated with reauthentication with a different channel.

6. The system of a claim 1, wherein the channel is one of an automated teller machine or an automated telephone operator.

7. The system of claim 1, wherein the authorization level is one or a plurality of predefined authorization levels.

8. The system of claim 1, wherein the service at least one of opens an account or processes a transaction.

9. A method, comprising:
   executing, on a processor, instructions that cause the processor to perform operations comprising:
   determining an authorization level for a user of a device based on a user identity and a class of authentication in response to a request for access to a service, wherein the class of authentication is associated with a strength of authentication with respect to a channel employed to enroll the user for access;
   generating an enrollment token including identifying information that identifies the device, the enrollment token defining a level of authorization based on the determined authorization level;
   sending the enrollment token to the device, and
   selectively controlling access to the service by the device based on the level of authorization defined by the enrollment token on the device.

10. The method of claim 9, the operations further comprising determining the authorization level based on initiation information provided at enrollment.

11. The method of claim 10, the operations further comprising determining the authorization level based on the initiation information regarding the device.

12. The method of claim 10, the operations further comprising determining the authorization level lower than that associated with the channel based on the initiation information.

13. The method of claim 9, the operations further comprising determining an updated authorization level based on a change in the class of authentication associated with reauthentication with a different channel.

14. A method, comprising:
   authenticating a user identity;
   determining an authorization level for a user of a device based on the user identity and a class of authentication in response to a request to perform a transaction, wherein the class of authentication is associated with an extent to which an authentication channel is able to accurately verify identity at enrollment;
   generating an enrollment token including identifying information that identifies the device, the enrollment token defining a level of authorization based on the authorization level;
   sending, the enrollment token to the device; and
   selectively permitting the transaction by the device based on the level of authorization defined by the enrollment token on the device.

15. The method of claim 14, further comprising determining the authorization level based on initiation information provided at enrollment.

16. The method of claim 15, further comprising determining the authorization level lower than that associated with the authentication channel based on the initiation information.

* * * * *